Figure 1:
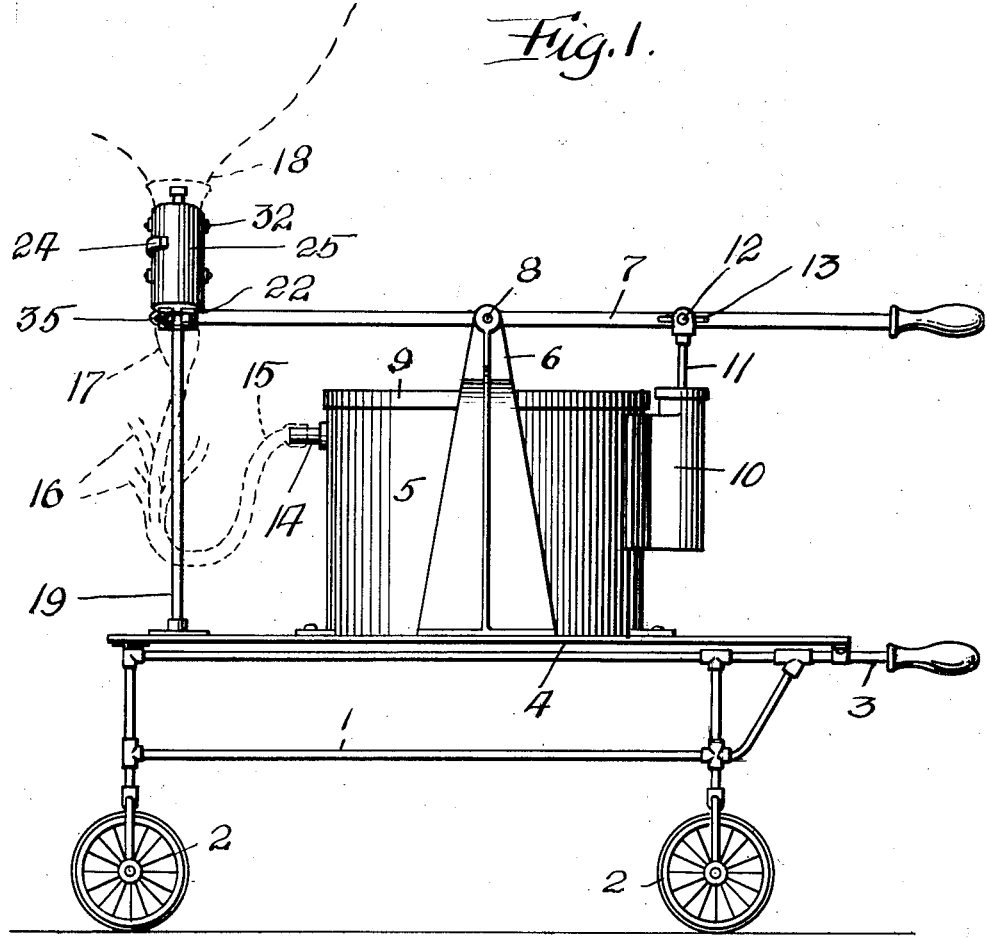

E. LÉVAY.
MILKING DEVICE.
APPLICATION FILED FEB. 3, 1912.

1,024,903.

Patented Apr. 30, 1912.

2 SHEETS—SHEET 1.

WITNESSES

INVENTOR
E. Lévay.
BY
ATTORNEYS

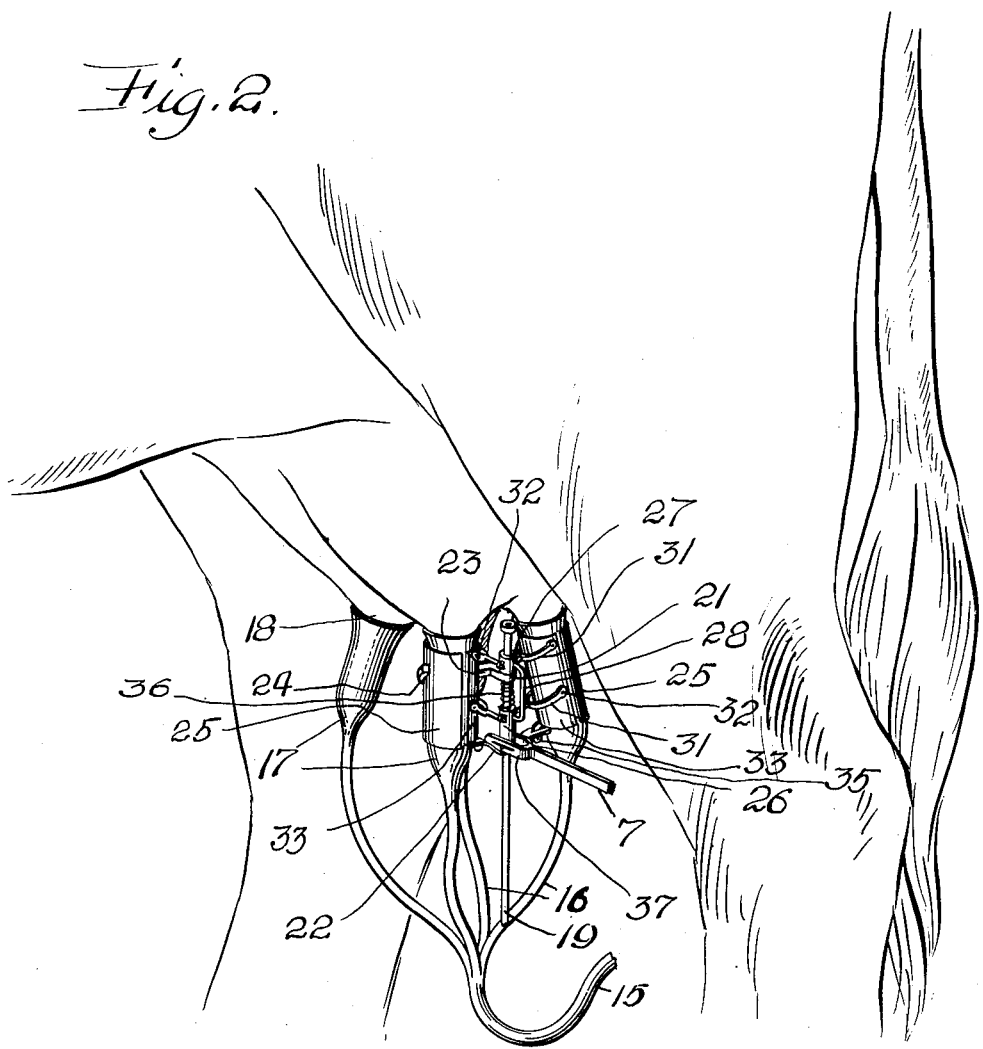
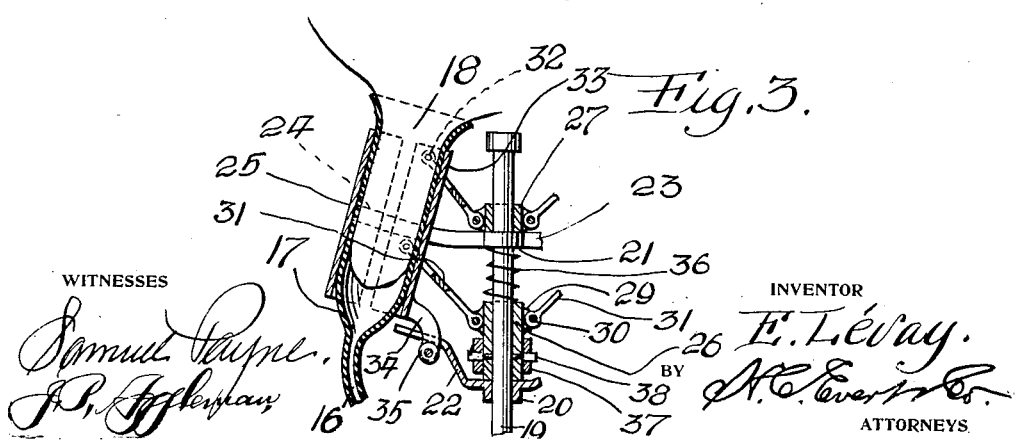

UNITED STATES PATENT OFFICE.

ELLIS LÉVAY, OF ENNIS, TEXAS.

MILKING DEVICE.

1,024,903.  Specification of Letters Patent.  Patented Apr. 30, 1912.

Application filed February 3, 1912. Serial No. 675,223.

*To all whom it may concern:*

Be it known that I, ELLIS LÉVAY, residing at Ennis, in the county of Ellis and State of Texas, have invented certain new and useful Improvements in Milking Devices, of which the following is a specification, reference being had therein to the accompanying drawing.

This invention relates to a milking device, and my invention aims to provide a portable device that can be easily moved from one cow to another and milk extracted from the teats, without injury to the same and without any danger of the device becoming clogged by butter fat or other semisolid matter in the milk.

The invention further aims to provide a milking device that is easily applied to the teats, safe to use, inexpensive to manufacture and highly efficient for the purposes for which it is intended.

The invention still further aims to accomplish the above results by a combination of mechanical elements that will be hereinafter specifically described and then claimed, and reference will now be had to the drawings, wherein:—

Figure 1 is a side elevation of a portion of the device, Fig. 2 is a perspective view of a portion of the device as applied to the teats of a cow, and Fig. 3 is a vertical sectional view of a portion of the device.

A device in accordance with this invention comprises a truck frame 1, preferably made of light tubing and movably supported by wheels 2. The truck frame 1 has handle bars 3 for moving the truck and mounted upon the truck frame is a platform 4 supporting a tank or receptacle 5.

Mounted upon the platform 4 at the sides of the tank 5 are bearings 6 for a fulcrumed lever 7, said lever being pivotally supported by a pin 8 connecting said bearings.

The tank 5 has a detachable air tight lid or cover 9, and associated with said tank is a suction pump 10 of a conventional form, said suction pump having the piston rod 11 thereof connected to the fulcrumed lever 7 by a pin 12 that extends through a longitudinal slot 13 in said lever. The tank 5 at a point diametrically opposite the suction pump 10 is provided with a connection 14 to which is connected a hose 15 having branches 16. The ends of the branches 16 terminate in nipples 17 that are fitted upon the teats 18 of a cow.

The platform 4, at the forward end thereof, has a guide post 19 and the upper end of the post is provided with spaced brackets 20 and 21, the former having radially bifurcated arms 22 and the latter radial arms 23 that have the ends thereof curved, as at 24 and provided with semicylindrical stationary nipple members 25.

Slidably mounted upon the post 19 above the brackets 20 and 21 are sleeves 26 and 27 connected by a yoke 28. The sleeves 26 and 27 are provided with apertured ears 29 and pivotally connected to said ears by pins 30 are Y-shaped yokes 31 that are pivotally connected, as at 32 to movable semicylindrical nipple members 33. The lower ends of the members 33 are provided with curved arms 34 that extend through the bifurcated ends of the arms 22 and the arms 34 have the ends thereof provided with revoluble rollers 35 that engage under the arms and prevent the members 33 from shifting vertically when actuated. Encircling the post 19 between the sleeve 26 and the bracket 21 is a coiled compression spring 36 that retains the members 33 normally retracted. The forward end of the fulcrumed lever 7 is provided with a slotted yoke 37 that is loosely connected by pins 38 to the sleeve 26.

To place the device in operation, the forward end of the truck is shifted under a cow and two of the nipples carried between the members 25 and 33 and placed upon the teats, the teats being lowered between said members. The other two nipples are placed upon the remaining teats to collect such milk as may be discharged during the milking operation of the first mentioned teats. The fulcrumed lever is then rocked and the sleeves 26 and 27 raised and lowered upon the post 19, said movement of the sleeves causing the members 33 to move back and forth toward the members 25, thereby pressing the nipples and the teats within said nipples. During this operation the milk that enters the hose 15 is drawn into the tank 5 by the suction pump 10. After the device has been in operation upon two of the teats, it is transferred to the other teats and the operation repeated.

What I claim is:—

1. A milking device comprising a tank, a guide post adapted to be positioned under a cow, a hose connected to said tank and having branches, nipples carried by the branches of said hose and adapted to be placed upon the teats of a cow, stationary members carried by said post and engaging said nipples, movable members associated with said stationary members and adapted to be moved to press said nipples, and means including yokes, sleeves and an operating lever for actuating said movable members.

2. A milking device comprising a tank, a guide post adapted to be positioned under a cow, a hose connected to said tank and having branches, nipples carried by the branches of said hose and adapted to be placed upon the teats of a cow, stationary members carried by said post and engaging said nipples, movable members associated with said stationary members and adapted to be moved to press said nipples, means including yokes, sleeves and an operating lever for actuating said movable members, and means associated with said tank and actuated by the lever of the first mentioned means for producing a suction in said hose.

3. A milking device comprising a tank, a guide post adapted to be positioned under a cow, a hose connected to said tank and having branches, nipples carried by the branches of said hose and adapted to be placed upon the teats of a cow, stationary members carried by said post and engaging said nipples, movable members associated with said stationary members and adapted to be moved to press said nipples, means including yokes, sleeves and an operating lever for actuating said movable members, means associated with said tank and actuated by the lever of the first mentioned means for producing a suction in said hose, and means carried by said post for preventing a vertical movement of said movable members relatively to said stationary members.

In testimony whereof I affix my signature in the presence of two witnesses.

ELLIS LÉVAY.

Witnesses:
G. M. HOGAN,
W. D. ARDEN.